(12) United States Patent
Beon et al.

(10) Patent No.: US 11,176,865 B2
(45) Date of Patent: Nov. 16, 2021

(54) ELECTRONIC DEVICE, DISPLAY APPARATUS, AND CONTROL METHOD THEREOF

(71) Applicant: SAMSUNG ELECTRONICS CO., LTD., Suwon-si (KR)

(72) Inventors: Namkyun Beon, Seoul (KR); Minjung Kim, Seoul (KR); Sang-kyun Im, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/336,226

(22) PCT Filed: Oct. 30, 2017

(86) PCT No.: PCT/KR2017/012094
§ 371 (c)(1),
(2) Date: Mar. 25, 2019

(87) PCT Pub. No.: WO2018/084516
PCT Pub. Date: May 11, 2018

(65) Prior Publication Data
US 2019/0213941 A1 Jul. 11, 2019

(30) Foreign Application Priority Data

Nov. 4, 2016 (KR) .................. 10-2016-0146738

(51) Int. Cl.
*G09G 3/20* (2006.01)
*G09G 3/32* (2016.01)
(Continued)

(52) U.S. Cl.
CPC ............ *G09G 3/2003* (2013.01); *G01J 3/506* (2013.01); *G09G 3/006* (2013.01); *G09G 3/32* (2013.01);
(Continued)

(58) Field of Classification Search
CPC ........ G09G 3/2003; G09G 3/006; G09G 3/32; G09G 2340/06; G09G 2320/0242;
(Continued)

(56) References Cited

U.S. PATENT DOCUMENTS 7,379,081 B2 5/2008 Park et al.
7,907,154 B2 3/2011 Rykowski et al.
(Continued)

FOREIGN PATENT DOCUMENTS

CN 1848218 A 10/2006
CN 101996614 B 11/2014
(Continued)

OTHER PUBLICATIONS

International Search Report (PCT/ISA/210) dated Mar. 9, 2018 issued by the International Searching Authority in International Application No. PCT/KR2017/012094.
(Continued)

*Primary Examiner* — Ibrahim A Khan
(74) *Attorney, Agent, or Firm* — Sughrue Mion, PLLC (57) ABSTRACT

An electronic device is disclosed. The electronic device includes a communication unit; a storage for storing a plurality of images obtained by respectively capturing multiple display modules disposed in a display panel of a display apparatus which displays a predetermined image; and a processor for calculating a target value for at least one of the brightness and color of each of a plurality of sub-pixels constituting the display panel, based on the plurality of images, calculating a correction coefficient for correcting at least one of the brightness and color of each of the multiple sub-pixels to the target value, and controlling the communication unit to transmit the calculated correction coefficient to the display apparatus.

15 Claims, 9 Drawing Sheets

(51) Int. Cl.
*G09G 3/00* (2006.01)
*G01J 3/50* (2006.01)
*G06F 3/14* (2006.01)

(52) U.S. Cl.
CPC ............. *G06F 3/1446* (2013.01); *G09G 3/20* (2013.01); *G09G 2300/026* (2013.01); *G09G 2320/0233* (2013.01); *G09G 2320/0242* (2013.01); *G09G 2320/0295* (2013.01); *G09G 2320/0626* (2013.01); *G09G 2320/0666* (2013.01); *G09G 2320/0686* (2013.01); *G09G 2320/0693* (2013.01); *G09G 2340/06* (2013.01); *G09G 2360/145* (2013.01); *G09G 2360/16* (2013.01); *G09G 2370/16* (2013.01)

(58) Field of Classification Search
CPC ... G09G 2320/0233; G09G 2320/0693; G09G 2320/0626; G09G 2360/145; G09G 2360/16; G09G 2300/026; G09G 3/20; G09G 2370/16; G09G 2320/0295; G09G 2320/0666; G09G 2320/0686; G01J 3/506; G06F 3/1446
See application file for complete search history.

(56) References Cited

U.S. PATENT DOCUMENTS

| | | | |
|---|---|---|---|
| 7,911,485 | B2 | 3/2011 | Rykowski et al. |
| 8,264,613 | B2 | 9/2012 | Harris et al. |
| 8,670,006 | B2 | 3/2014 | Hong et al. |
| 8,836,797 | B1* | 9/2014 | Rykowski ............... G09G 3/006 345/589 |
| 9,135,851 | B2 | 9/2015 | Rykowski |
| 9,357,209 | B2 | 5/2016 | Kim et al. |
| 10,388,251 | B2* | 8/2019 | Katougi ................... G09G 5/02 |
| 2004/0104871 | A1 | 6/2004 | Boldt, Jr. et al. |
| 2004/0246274 | A1* | 12/2004 | Rykowski ............... G09G 5/06 345/690 |
| 2005/0134525 | A1* | 6/2005 | Tanghe ................. G09G 3/3208 345/1.1 |
| 2006/0139669 | A1* | 6/2006 | Takahashi ............... H04N 1/622 358/1.9 |
| 2006/0232183 | A1 | 10/2006 | Park et al. |
| 2008/0150880 | A1 | 6/2008 | Inuzuka et al. |
| 2011/0134150 | A1* | 6/2011 | Imamura ............... G06F 3/1446 345/690 |
| 2011/0234644 | A1 | 9/2011 | Park et al. |
| 2011/0267365 | A1 | 11/2011 | Kostal et al. |
| 2011/0279426 | A1* | 11/2011 | Imamura ................ G09G 3/30 345/207 |
| 2011/0285763 | A1* | 11/2011 | Bassi .................. G09G 3/2003 345/694 |
| 2012/0014593 | A1* | 1/2012 | Jaynes .................. G06F 3/1446 382/165 |
| 2012/0038660 | A1* | 2/2012 | Han ...................... G09G 3/2003 345/590 |
| 2014/0009485 | A1* | 1/2014 | Asanuma ................ G09G 5/02 345/590 |
| 2014/0043369 | A1* | 2/2014 | Albrecht .................. G09G 5/02 345/690 |
| 2015/0146017 | A1* | 5/2015 | Kim ....................... H04N 17/04 348/189 |
| 2015/0221078 | A1* | 8/2015 | Kim ....................... G09G 3/006 345/1.3 |
| 2015/0262360 | A1 | 9/2015 | Chen et al. |
| 2016/0117993 | A1* | 4/2016 | Buckley ............... G09G 3/3413 345/694 |
| 2016/0155389 | A1 | 6/2016 | Beon et al. |
| 2016/0163246 | A1* | 6/2016 | Lee ......................... G09G 5/02 |
| 2016/0307493 | A1 | 10/2016 | Song et al. |
| 2019/0213941 | A1* | 7/2019 | Beon ..................... G09G 3/006 |

FOREIGN PATENT DOCUMENTS

| | | |
|---|---|---|
| CN | 104599656 A | 5/2015 |
| CN | 105390119 A | 3/2016 |
| KR | 10-2006-0012995 A | 2/2006 |
| KR | 10-0902792 B1 | 6/2009 |
| KR | 10-2009-0128151 A | 12/2009 |
| KR | 10-1065406 B1 | 9/2011 |
| KR | 10-2011-0138473 A | 12/2011 |
| KR | 10-1351414 B1 | 1/2014 |
| KR | 10-2015-0059268 A | 6/2015 |

OTHER PUBLICATIONS

Written Opinion (PCT/ISA/237) dated Mar. 9, 2018 issued by the International Searching Authority in International Application No. PCT/KR2017/012094.
Communication dated Jun. 25, 2019, from the European Patent Office in counterpart European Application No. 17867076.6.
Communication dated Feb. 18, 2021, from the Intellectual Property Office of India in Application No. 201917010378.
Communication dated Jul. 15, 2021 by the European Patent Office in counterpart European Patent Application No. 17867076.6.
Communication dated Sep. 13, 2021 by the State Intellectual Property Office of P.R. China in counterpart Chinese Patent Application No. 201780064198.1.

* cited by examiner

ELECTRONIC DEVICE, DISPLAY APPARATUS, AND CONTROL METHOD THEREOF

TECHNICAL FIELD

The disclosure relates to an electronic device, a control method thereof, and a display apparatus and, more particularly, to an electronic device which transmits a correction coefficient to a display apparatus to perform correction of the display apparatus, a display apparatus, and a control method thereof.

BACKGROUND ART

With the development of electronic technology, various types of electronic devices have been developed and deployed. Among them, a display apparatus is widely used in a general household, a company, an outdoor signage, and the like.

Among the electronic devices, a liquid emitting diode (LED) display apparatus may have different brightness and color generated by the same current as the characteristics of the LED elements constituting the LED display apparatus are different. Accordingly, non-uniformity of brightness and color may occur in an overall LED display apparatus.

In order to solve the non-uniformity of the LED display apparatus, a correction for the pixels constituting the LED display apparatus is performed, after the process of producing the LED display apparatus or installing the LED display apparatus.

In the case of correcting a high-quality display apparatus such as full high definition (FHD) (1920*1080) and ultra high definition (UHD) (3840*2160) in units of an LED pixel, the amount of data to be processed is large, and a lot of time is required for the correction. In addition, when the correction is performed in a unit of a module of a display apparatus, there is a problem that brightness and color deviation are generated per module.

DETAILED DESCRIPTION OF THE DISCLOSURE

Technical Objects

The embodiment of the disclosure is to provide an electronic device for calculating a target value based on a plurality of sub-pixels constituting a display panel, a display apparatus, and a control method thereof.

Technical Solving Method

According to an embodiment of the disclosure to achieve the above-described object, an electronic device includes a communication unit, a storage configured to store a plurality of images obtained by respectively capturing a plurality of display modules disposed in a display panel of a display apparatus which displays a predetermined image, and a processor to calculate a target value for at least one of brightness and color of each of a plurality of sub-pixels constituting the display panel, on a basis of the plurality of images, calculate a correction coefficient for correcting at least one of the brightness and color of each of the plurality of sub-pixels to the target value, and control the communication unit such that the calculated correction coefficient is transmitted to the display apparatus.

The processor may calculate a representative value with respect to at least one of brightness and color of each of the plurality of sub-pixels and calculate the target value on a basis of the calculated representative value.

The electronic device may further include an inputter configured to receive a user command, and the processor may set the target value on a basis of a value inputted through the inputter and the representative value.

The image may be an image which captures at least one of the brightness and color of a plurality of sub-pixels constituting the display panel through a colorimeter.

The display module may be implemented as a light emitting diode (LED) module including at least one LED element or an LED cabinet connected with a plurality of LED modules.

A display apparatus according to an embodiment of the disclosure includes a display panel including a plurality of display modules each of which is composed of a plurality of sub-pixels, a storage for storing a correction coefficient with respect to at least one of the brightness and color of a plurality of sub-pixels constituting the display panel, and a processor for correcting at least one of the brightness and color of the plurality of the sub-pixels based on the correction coefficient, and the correction coefficient may be a target value calculated on a basis of a plurality of images which capture each of the plurality of display modules and may be a value for correcting at least one of the brightness and color of the plurality of sub-pixels.

The display apparatus further includes a communication unit, and the processor may store the correction coefficient received from an external electronic device through the communication unit in the storage, and the external electronic device may calculate the target value based on at least one of the brightness and color of each of the plurality of sub-pixels constituting the display panel based on the plurality of images, calculate a correction coefficient to correct at least one of the brightness and color of the plurality of sub-pixels to the target value, and transmit the correction coefficient to the display apparatus.

According to an embodiment of the disclosure, a control method for an electronic device for correcting at least one of the brightness and color of a plurality of sub-pixels constituting a display panel may include obtaining a plurality of images which capture each of a plurality of display modules constituting the display panel which displays a predetermined image; calculating a target value on a basis of at least one of the brightness and color of each of the plurality of sub-pixels on a basis of the plurality of images; and calculating a correction coefficient for correcting at least one of the brightness and color of each of the plurality of sub-pixels to the target value, and transmitting the calculated correction coefficient to the display apparatus.

The calculating the target value may include calculating a representative value with respect to at least one of the brightness and color of each of the plurality of sub-pixels and calculating the target value on a basis of the calculated representative value.

The control method may further include receiving a user command, and the calculating the target value may include calculating the target value on a basis of a value inputted according to the user command and the representative value.

The plurality of images may be images which capture at least one of the brightness and color of a plurality of sub-pixels constituting the display panel through a colorimeter.

The display module may be implemented as an LED module including at least one LED element or an LED cabinet connected with a plurality of LED modules.

The control method of the display apparatus including the display panel including a plurality of display modules may include storing a correction coefficient with respect to at least one of brightness and color of a plurality of sub-pixels constituting the display panel and correcting at least one of the brightness and color of the plurality of sub-pixels based on the correction coefficient, and the correction coefficient may be a value to correct at least one of the brightness and color of the plurality of sub-pixels to a target value calculated based on a plurality of images which capture each of the plurality of display modules constituting the display panel.

Here, the storing may include receiving and storing the correction coefficient from an external device, and the external electronic device may calculate the target value based on at least one of the brightness and color of each of the plurality of sub-pixels constituting the display panel based on the plurality of images, calculate a correction coefficient to correct at least one of the brightness and color of the plurality of sub-pixels to the target value, and transmit the correction coefficient to the display apparatus.

Advantageous Effect

As described above, according to the various embodiments of the disclosure, a target value and a correction coefficient which consider all sub-pixels constituting the display panel are calculated and thus, correction performance of the display apparatus may become optimal.

MODE FOR EMBODYING THE INVENTION

The above and other features and advantages of the disclosure will become more apparent by describing in detail embodiments thereof with reference to the attached drawings. In addition, the same reference numerals are assigned to the same or corresponding parts in each drawing, and redundant explanations are omitted.

Hereinafter, various embodiments will be described in greater detail with reference to the attached drawings.

Figure 1:
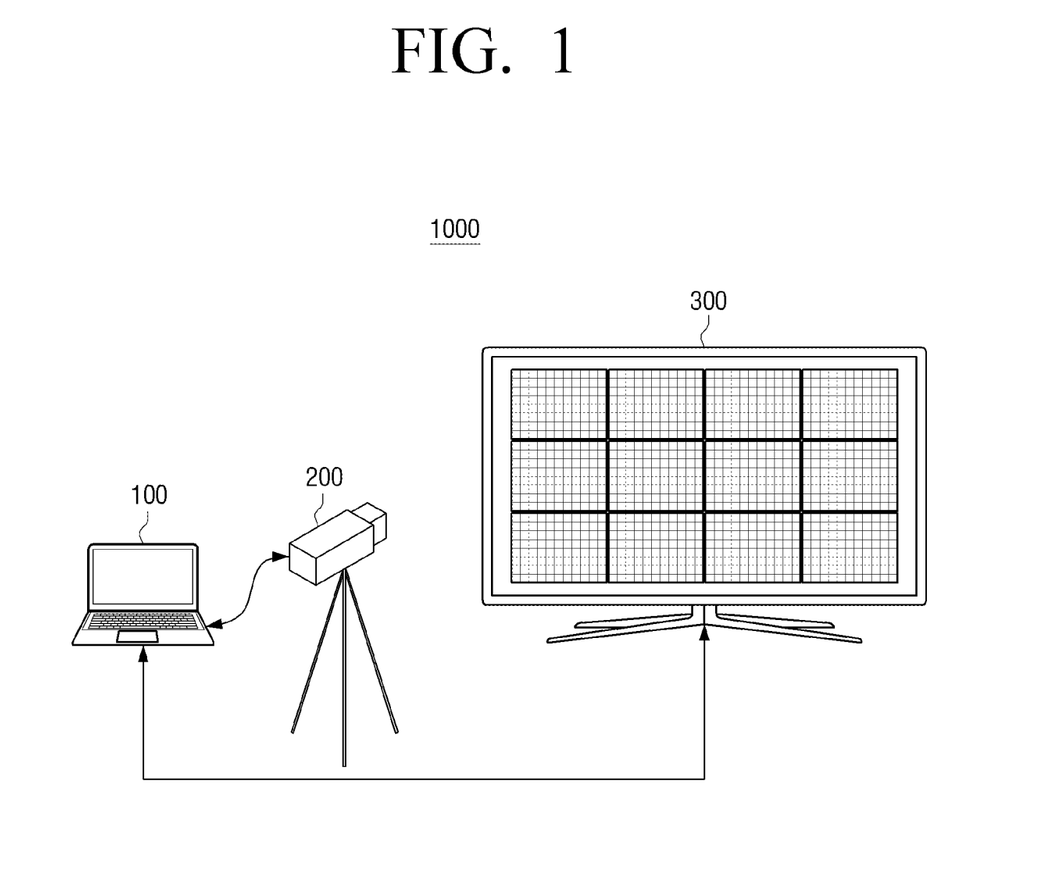
FIG. 1 is a view illustrating a configuration of a correction system of a display apparatus according to an embodiment of the disclosure.

FIG. 1 is a view illustrating a configuration of a correction system of a display apparatus according to an embodiment of the disclosure.

As described in FIG. 1, the display apparatus correction system according to an embodiment of the disclosure includes an electronic device 100, a measuring device 200, and a display apparatus 300.

The electronic device 100 may be implemented by various user terminal devices such as a PC, a laptop PC, a mobile phone, a tablet PC, and the like, but is not limited thereto. Further, the electronic device 100 may be implemented as a device that performs only display apparatus correction.

The measuring device 200 may be implemented as a camera, a colorimeter, a meter, or the like. Generally, in order to measure the brightness and color of a sub-pixel of the display apparatus 300, a camera-type colorimeter is used. Here, the camera-type colorimeter is composed of a charge coupled device (CCD) sensor, a lens, a body, and the like, and may measure brightness (brightness value) and color (color coordinate value) of the sub-pixel of the display apparatus 300 from an image captured by the camera. The measured brightness and color of the display apparatus 300 may be stored as data of Lv, x, y coordinates or data of X, Y, Z coordinates.

The measuring device 200 may be located at position distant from the display apparatus 300 by a certain distance and may be fixed in one place until capturing of the display panel of the display apparatus 300 is completed. Exposure, aperture, focus, etc. of the measuring device 200 may be set automatically or may be set manually if desired by a user. In addition, exposure, aperture, focus, etc. of the measuring device 200 may be set differently depending on the type of measuring devices.

In addition, the measuring device 200 may capture a display panel displaying a predetermined image, and measure brightness and color corresponding to the captured image. However, an embodiment of the disclosure is not limited thereto, and the electronic device 100 may measure brightness and color based on the image captured by the measuring device 200. For example, the display panel may display red, green, and blue in full color as a predetermined image. Also, white may be displayed. The measuring device 200 may capture the display panel, when the predetermined image (e.g., red, green, blue, white in full color) is displayed on the display panel.

Referring to FIG. 1, the display apparatus 300 according to an embodiment of the disclosure may include a display panel to which a plurality of display modules (or a modular display apparatus) is connected. Here, each of the plurality of display modules may include a plurality of pixels arranged in a matrix form. In particular, the display module may be implemented as an LED module in which a plurality of pixels are implemented as LED pixels or an LED cabinet in which a plurality of LED modules are connected, but it is not limited thereto. For example, the display module may be implemented as a liquid crystal display (LCD), an organic LED (OLED), an active matrix OLED (AMOLED), a plasma display panel (PDP), and the like. Hereinafter, for convenience of description, it is assumed that the display module is implemented as an LED module or an LED cabinet.

When the measuring device 200 captures the display panel, the display panel may be divided into a plurality of areas for capturing based on at least one of the size and resolution of the display panel, and performance of the measuring device. Accordingly, the measuring device 200 may capture a plurality of display modules constituting the display panel in units of display modules. However, the embodiment of the disclosure is not limited thereto, and the measuring device 200 may capture the entire display panel. The image captured by the measuring device 200 may be transmitted to the electronic device 100.

The measuring device 200 according to an embodiment of the disclosure may be located outside the electronic device 100 to be separated from the electronic device 100, or inside the electronic device 100. In addition, the measuring device 200 may be combined with the electronic device 100 and implemented as a single device. That is, in one device in which the electronic device 100 and the measuring device 200 are combined, a predetermined image displayed by the display panel may be captured and a correction coefficient may be calculated.

Meanwhile, the electronic device 100 may store an image for each of a plurality of display modules constituting the display panel captured by the measuring device 200. Specifically, when the measuring device 200 divides and captures the display panel in display module units, and transmits the captured image to the electronic device 100, the electronic device 100 may store the transmitted image. In this case, the electronic device 100 may calculate a target value based on at least one of the brightness and color of each of the plurality of sub-pixels constituting the display panel based on the plurality of transmitted images. Accordingly, the electronic device 100 may calculate the target value based on all the sub-pixels constituting the display panel.

In addition, the electronic device 100 may calculate a correction coefficient for correcting at least one of the brightness and color of a plurality of sub-pixels constituting the display panel to the target value, and transmit the correction coefficient to the display apparatus 100. Here, the correction coefficient is a value that is applied to each sub-pixel to correct the brightness and color of each sub-pixel to the target value. That is, the electronic device 100 may transmit the correction coefficient to the display apparatus 300. The display apparatus 300 may correct each sub-pixel constituting the display panel using the correction coefficient received from the electronic device 100.

According to various embodiments of the disclosure, since the target value is calculated based on all the sub-pixels constituting the display panel, it is possible to minimize the deviation of the brightness and color for each display module. Hereinbelow, various embodiments will be described.

Figure 2:
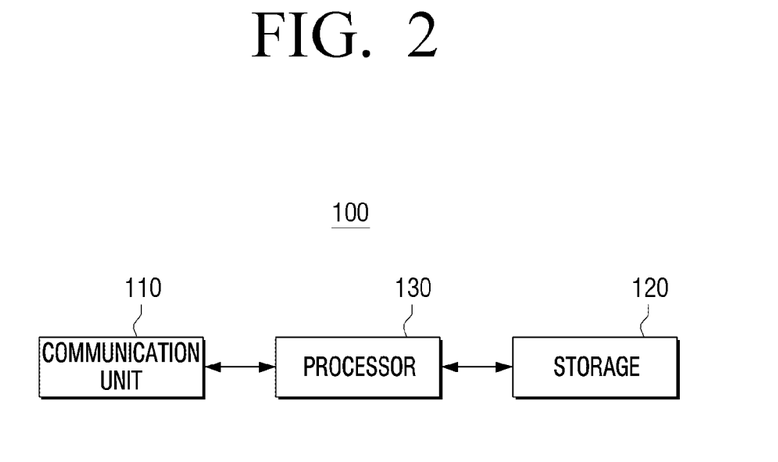
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device 110 includes a communication unit 110, a storage 120, and a processor 130.

The communication unit 110 communicates with the measuring device 200 or the display apparatus 300. Here, the communication unit 110 may communicate with the display apparatus 300 through various communication methods such as Bluetooth (BT), Wireless Fidelity (WI-FI), Zigbee, infrared (IR), serial interface, universal serial bus (USB), near field communication (NFC), or the like.

The communication unit 110 may receive an image of the display panel of the display apparatus 300 or receive a pixel value of the display panel from the measuring device 200. Here, the pixel value indicates a value indicating information of at least one of the brightness and color for each sub-pixel included in the display panel. For example, the pixel value may be a coordinate value in the CIE xyY color space indicating the brightness and color of the sub-pixel. However, when the measuring device 200 is consisted as one device along with the electronic device 100, the electronic device 100 may calculate the target value of at least one of the brightness and color of each of the sub-pixels using the captured image, without a separate receiving process. Further, a correction coefficient for correcting at least one of the brightness and color of the plurality of sub-pixels to the calculated target value may be calculated.

Also, the communication unit 110 may transmit the correction coefficient to the display apparatus 300. Specifically, when the correction coefficient for each of the plurality of sub-pixels is calculated by the processor 130, the communication unit 110 may transmit the calculated correction coefficient to the display apparatus 300 and correct the plurality of sub-pixels constituting the display apparatus 300.

The storage 120 stores various data such as data to operate the electronic device 100, operation system (O/S) software module, and various multimedia contents.

In particular, the storage 120 may store a captured image received from the measuring device 200. Specifically, when the measuring device 200 captures each of the display modules constituting the display panel and transmits them to the electronic device 100, the transmitted image is stored in the storage 120. For example, when a display panel composed of a plurality of display modules displays a predetermined image, the measuring device 200 may sequentially capture the display panel by dividing the display panel into units of display modules. The captured image is stored in the storage 120. Here, the predetermined image may be red, green, or blue in full color, but is not limited thereto. Various images for measuring at least one of the brightness and color of sub-pixels constituting the display panel may be displayed as predetermined images.

In addition, the storage 120 may store information on a binning group, information on the maximum brightness per pixel constituting the display panel, and information on colors per pixel. Here, the binning group may be a group of LED pixels having the same characteristics (brightness, color coordinates, etc.) to the maximum for LED pixels.

The storage 120 may store a program such as a target value calculation module, a correction coefficient calculation module for each sub-pixel for correcting at least one of brightness and color of the sub-pixel, a representative value calculation module, and a communication module necessary for transmitting the correction coefficient, according to an embodiment of the disclosure.

The processor 130 may calculate the target value based on a plurality of images capturing each of the plurality of display modules. Specifically, the target value may be calculated based on at least one of the brightness and color of each of the plurality of sub-pixels constituting the display panel. For example, when all the display modules constituting the display panel are captured, the target value based on at least one of the brightness and color of all the sub-pixels constituting the display panel may be calculated.

Here, the target value may be at least one of brightness (brightness value) and color (color coordinate value) satisfying a predetermined condition. Specifically, at least one of the brightness and color measured from the image capturing the specific display module, among the images stored in the storage 120, may be set as the target value.

In some cases, the processor 130 may exclude the brightness and color less than or equal to a predetermined threshold value among the brightness and color of a plurality of sub-pixels, and determine a target value based on the brightness and color of the remaining sub-pixels.

Also, the processor 130 may calculate a representative value for at least one of the brightness and color of each of the plurality of sub-pixels, and calculate the target value based on the calculated representative value. Specifically, the representative value may be an average value of at least one of the brightness and color of a plurality of sub-pixels constituting the display panel. However, the disclosure is not limited thereto, and various values such as 80% or 90% of the average value may be calculated as representative values.

Meanwhile, the processor 130 may calculate a correction coefficient for correcting at least one of brightness and color of a plurality of sub-pixels to a target value. For example, a correction coefficient for correcting the brightness and color of each of the sub-pixels calculated from the image to the target brightness and the target color may be calculated.

Figure 3:
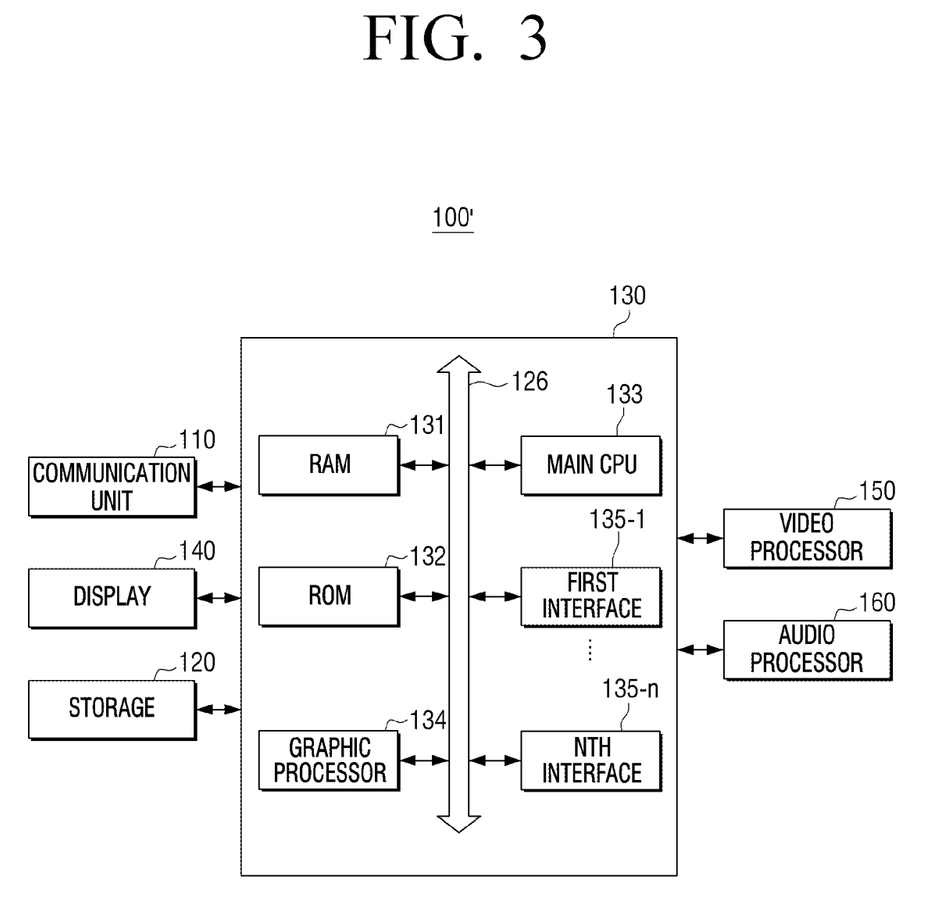
FIG. 3 is a block diagram illustrating a detailed configuration of the electronic device of FIG. 2.

FIG. 3 is a block diagram illustrating a detailed configuration of the electronic device of FIG. 2.

Referring to FIG. 3, an electronic device 100' includes the communication unit 110, the storage 120, the processor 130, a display 140, a video processor 150, and an audio processor 160. From among the configurations of FIG. 3, description of the parts overlapping with the configurations illustrated in FIG. 2 will be omitted.

The processor 130 controls overall operations of the electronic device 100'.

To be specific, the processor 130 includes a random-access memory (RAM) 131, a read-only memory (ROM) 132, a main central processing unit (CPU) 133, a graphic processor 134, a first to $n^{th}$ interface 135-1 to 135-$n$, and bus 136.

The RAM 131, the ROM 132, the main CPU 133, the graphic processor 134, and the first to $n^{th}$ interfaces 135-1 to 135-$n$ may be interconnected through the bus 136.

The first to $n^{th}$ interfaces 135-1 to 135-$n$ are connected with aforementioned various elements. One of the interfaces may be a network interface which is connected to an external device through network.

The main CPU 133 performs booting using the O/S stored in the storage 120 by accessing the storage 120, and may perform various operations using various programs, contents, and data stored in the storage 120.

The ROM 132 stores a command set for system booting. When a turn-on command is input and power is supplied, the main CPU 133 copies the O/S stored in the storage 120 to the RAM 131 according to the command stored in the ROM 132, executes the O/S and boots the system. When system booting is completed, the main CPU 133 copies various application programs stored in the storage 120 to the RAM 131, executes the application programs copied to the RAM 131, and performs various operations.

An inputter (not shown) receives a user command. The processor 130 may set a target value based on a value inputted from a user through an inputter and a representative value.

The graphic processor 134 may generate a screen including various objects such as an icon, an image, text and the like using a calculator (not shown) and a renderer (not shown), for example, a screen including the image capturing each display module of the display panel. The calculator (not shown) may calculate the target brightness and the target color based on the received control command or set the target brightness and the target color based on the brightness and color input from the user.

In addition, the electronic device 100' may further include a video processor 150 for performing processing on video data, an audio processor 160 for performing processing on audio data, a speaker for outputting not only audio data processed by the audio processor 160 but also various kinds of notices or voice messages, a camera for capturing a still image or a moving picture according to a user's control, a microphone for receiving user's voice or other sound and converting the voice or sound into audio data.

In the above-described embodiment, it has been described that the calculation of the correction coefficient for correcting at least one of the brightness and color of the plurality of sub-pixels to the target value is performed in the electronic device 100', but this is merely exemplary. The display apparatus 300 may calculate the target value and the correction for the plurality of sub-pixels may be performed by the correction coefficient stored in the display apparatus 300.

Figure 4:
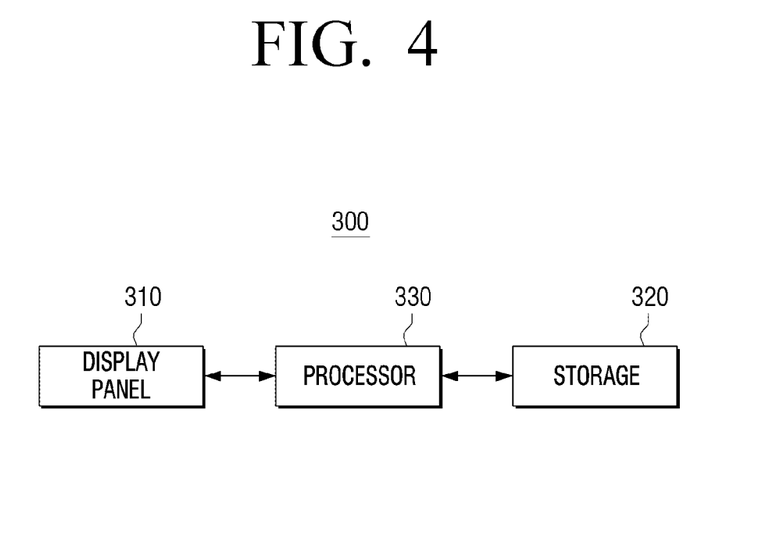
FIG. 4 is a block diagram illustrating a configuration of the display apparatus according to an embodiment of the disclosure.

FIG. 4 is a block diagram illustrating a configuration of the display apparatus according to an embodiment of the disclosure.

Referring to FIG. 4, the display apparatus 300 includes a display panel 310, a storage 320, and a processor 330.

The display panel 310 may be implemented as an LED module (an LED module including at least one LED element) or an LED cabinet in which a plurality of LED modules are connected. Also, the LED module may include a plurality of LED pixels, according to an example, the LED pixel may be implemented as an RGB LED, and the RGB LED may include a red LED, a green LED, and a blue LED.

The storage 320 stores various data required for an operation of the modular display apparatus 300.

The storage 320 may store a correction coefficient for at least one of the brightness and color of a plurality of sub-pixels constituting the display panel 310. In addition, the storage 320 may store a plurality of images of each of the plurality of display modules.

The processor 330 controls overall operations of the display apparatus 300.

In particular, the processor 330 may calculate the target value based on a plurality of images of each of the plurality of display modules, and based on a correction coefficient for correcting the brightness and color of the plurality of sub-pixels to the target value, correct a plurality of sub-pixels.

In addition, the display apparatus 300 may include a communication unit (not shown). Specifically, the communication unit may receive the correction coefficient from an external electronic device. Here, the correction coefficient may be a value calculated by the external electronic device to correct at least one of the brightness and color of the plurality of sub-pixels constituting the display apparatus 300 to the target value.

Therefore, the display apparatus 300 may correct at least one of the brightness and color of the plurality of sub-pixels constituting the display panel 310 based on the target value and the correction coefficient on a basis of a plurality of images capturing each of the plurality of display modules 310-1 and 310-2.

Figure 5:
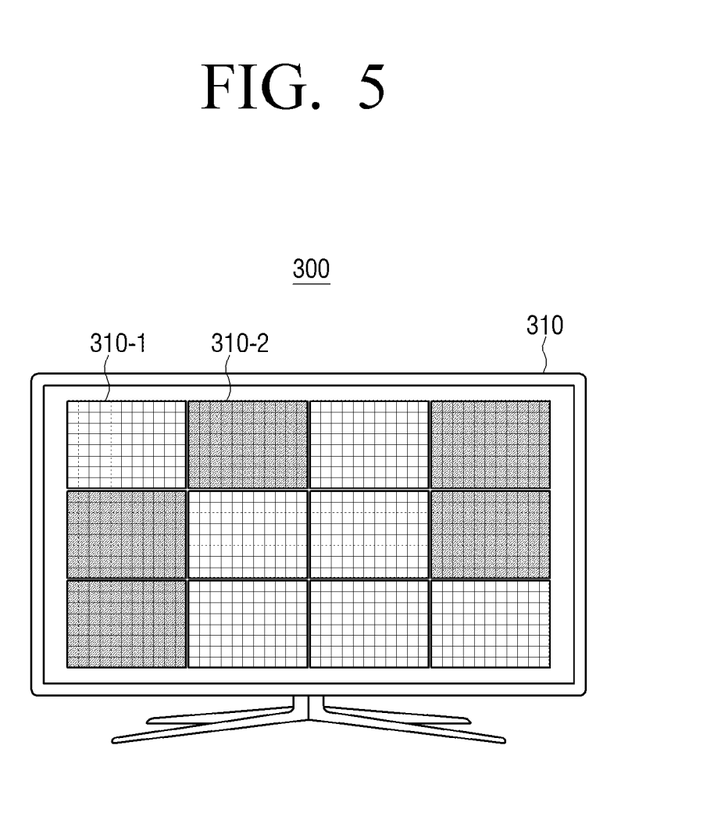
FIG. 5 is a view to describe correction of each display module according to a prior art.

FIG. 5 is a view to describe correction of each display module according to the related art.

In the related art, in order to correct at least one of the brightness and color of the display panel composed of a plurality of display modules 310-1 and 310-2, based on the image captured in units of the display modules 310-1 and 310-2, the target value for each module is calculated, and the brightness and color of the sub-pixels constituting each module are corrected. For example, when the measuring device 200 captures the first display module 310-1, the related-art electronic device calculates the target value and the correction coefficient for the first display module, and based on the calculated correction coefficient, corrects the brightness and color of the sub-pixels constituting the first display module based on the calculated correction coefficient.

In the related art, after correction is completed, non-uniformity of brightness and color occurs for each of the display modules 310-1 and 310-2, as shown in FIG. 5.

Hereinbelow, correction of a sub-pixel constituting the display panel according to an embodiment of the disclosure will be described.

Figure 6:
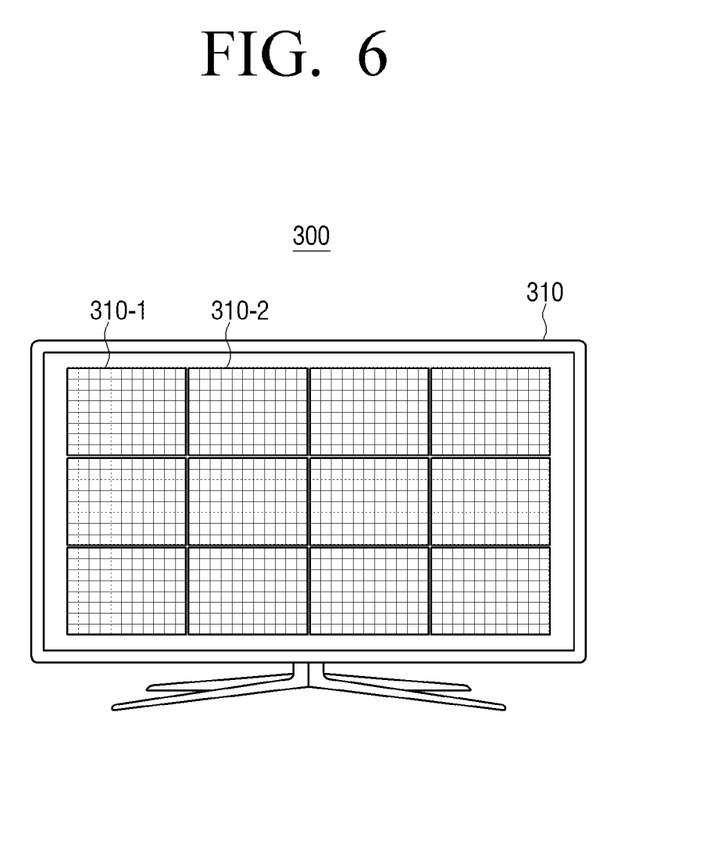
FIG. 6 is a view to describe sub-pixel correction of a display apparatus according to an embodiment of the disclosure.

FIG. 6 is a view to describe sub-pixel correction of a display apparatus according to an embodiment of the disclosure.

The display panel 310 of the display apparatus 300 according to an embodiment of the disclosure may include a plurality of display modules 310-1 and 310-2 as shown in FIG. 6. Also, the display modules 310-1 and 310-2 may be implemented as an LED module including at least one LED element or an LED cabinet connected with a plurality of LED modules.

The measuring device 200 may capture the display panel 310 in units of display modules. Therefore, the measuring device may sequentially capture all the display modules provided in the display panel 310, starting from the first display module 310-1.

The image captured by the measuring device 200 is transmitted to the electronic device 100, and the electronic device 100 may measure the brightness and color of each of the plurality of sub-pixels constituting the display panel 310 based on the plurality of transmitted images. Specifically, the values may be values of R, G, and B of sub-pixels constituting one pixel, but the values are not limited thereto, and values of white (w) and yellow (Y) may be further included, in addition to values of R, G, and B.

The electronic device 100 may calculate the target value based on the brightness and color of all the sub-pixels constituting the display panel from the plurality of images. Here, the target value may be the brightness and color of the sub-pixel constituting a particular display module (e.g., 310-1). However, the disclosure is not limited thereto, and it is also possible to exclude the brightness and color which are less than or equal to a predetermined threshold value among the brightness and color of a plurality of sub-pixels constituting the display panel 310, and set the target value based on the brightness and color of the remaining sub-pixels. It is also possible to set the highest brightness, intermediate brightness or lowest brightness to the target value.

The electronic device 100 according to another embodiment of the disclosure may calculate a representative value for at least one of the brightness and the color of each of a plurality of sub-pixels and calculate a target value based on the calculated representative value. Here, the representative value may be an average of the brightness and color of a plurality of sub-pixels, that is, average brightness and average color. However, the disclosure is not limited thereto, and various values such as 80% or 90% of the average value may be calculated as representative values.

Furthermore, the electronic device 100 may set the target value based on a value that is input from a user. For example, the electronic device 100 may calculate a target brightness and a target color based on a specific value and a representative value that are input by the user.

The electronic device 100 may calculate a correction coefficient for correcting at least one of the brightness and color of the plurality of sub-pixels to the target value based on the calculated target value, and may transmit the correction coefficient to the display apparatus 300. Here, the correction factor may have the form of a 3×3 matrix as shown below.

$$\begin{pmatrix} R' \\ G' \\ B' \end{pmatrix} = \begin{pmatrix} C_{RR} & C_{RG} & C_{RB} \\ C_{GR} & C_{GG} & C_{GB} \\ C_{BR} & C_{BG} & C_{BB} \end{pmatrix} \begin{pmatrix} R \\ G \\ B \end{pmatrix}$$

Here, R', G' and B' are the target brightness and target color, R, G and B are the brightness and color measured from the captured image, and CRR to CBB are correction coefficients.

However, if a plurality of LEDs included in the module have the same brightness and color, a correction coefficient may be newly generated to unify the brightness and color among the modules. However, for some cases, if there is an existing correction coefficient, modifying the correction coefficient is possible. For example, when there is a correction coefficient for unifying the brightness and color of a plurality of LEDs included in each module, an existing correction coefficient may be updated for uniformity of brightness and color among modules according to an embodiment of the disclosure.

In the above embodiment, it has been described that one pixel includes three sub-pixels of R, G, and B, but the sub-pixels may have four sub-pixels such as R/G/G/B, R/R/G/B, R/G/B/W, and R/G/B/Y, or may be composed of five or more sub-pixels.

Since the electronic device 100 considers all the sub-pixels constituting the display panel 310 in order to calculate the target value and the correction coefficient, the corrected display panel 310, as shown in FIG. 6, may have the same brightness and color for each of the display modules 310-1 and 310-2.

Meanwhile, the display apparatus 300 according to another embodiment of the disclosure may store a correction coefficient for at least one of the brightness and color of a plurality of sub-pixels constituting the display panel 310. Therefore, the display apparatus 300 may correct at least one of the brightness and color of a plurality of sub-pixels constituting the display panel 310 based on the target value and the correction coefficient calculated based on the plurality of images which capture each of the plurality of display modules 310-1 and 310-2.

The display apparatus 300 according to an embodiment of the disclosure may store a plurality of images of the plurality of display modules 310-1 and 310-2. Accordingly, the display apparatus 300 may calculate the target value and the correction coefficient based on the plurality of images, and correct at least one of the brightness and color of each of the plurality of sub-pixels to the target value based on the correction coefficient.

Hereinbelow, a method of calculating a correction coefficient by the electronic device will be described.

Figure 7:
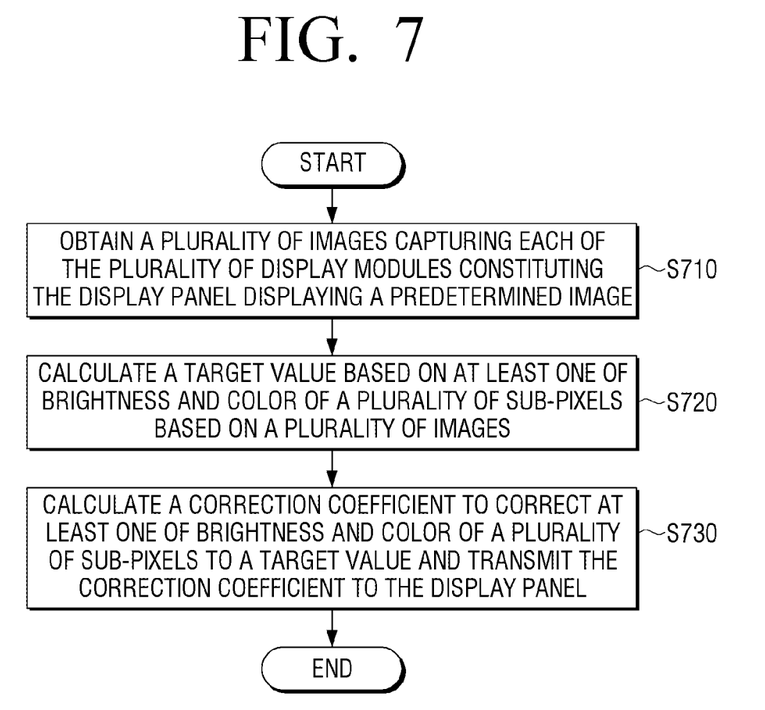
FIG. 7 is a flowchart to describe a control method of an electronic device according to an embodiment of the disclosure.

FIG. 7 is a flowchart to describe a control method of an electronic device according to an embodiment of the disclosure.

According to the control method of the electronic device shown in FIG. 7, a plurality of images obtained by capturing each of the plurality of display modules constituting the display panel for displaying the predetermined image are obtained in operation S710.

Then, based on a plurality of images, the target value is calculated on the basis of at least one of the brightness and color of each of the plurality of sub-pixels in operation S720.

Subsequently, a correction coefficient for correcting at least one of the brightness and color of the plurality of sub-pixels to the target value is calculated and transmitted to the display panel in operation S730.

Also, in operation S730, a representative value for at least one of the brightness and color of each of the plurality of sub-pixels may be calculated, and the target value may be calculated based on the calculated representative value.

In addition, the control method may further include a step of receiving a user command, and in operation S730, the target value may be calculated based on the input value and the representative value according to the user command.

The plurality of images may be images in which at least one of the brightness and color of a plurality of sub-pixels constituting the display panel are captured through a colorimeter.

Also, in the control method, the display module may be implemented as an LED module including at least one LED element or an LED cabinet connected with a plurality of LED modules.

Hereinbelow, a method of calculating a correction coefficient by the correction system of the display apparatus 300 will be described.

Figure 8:
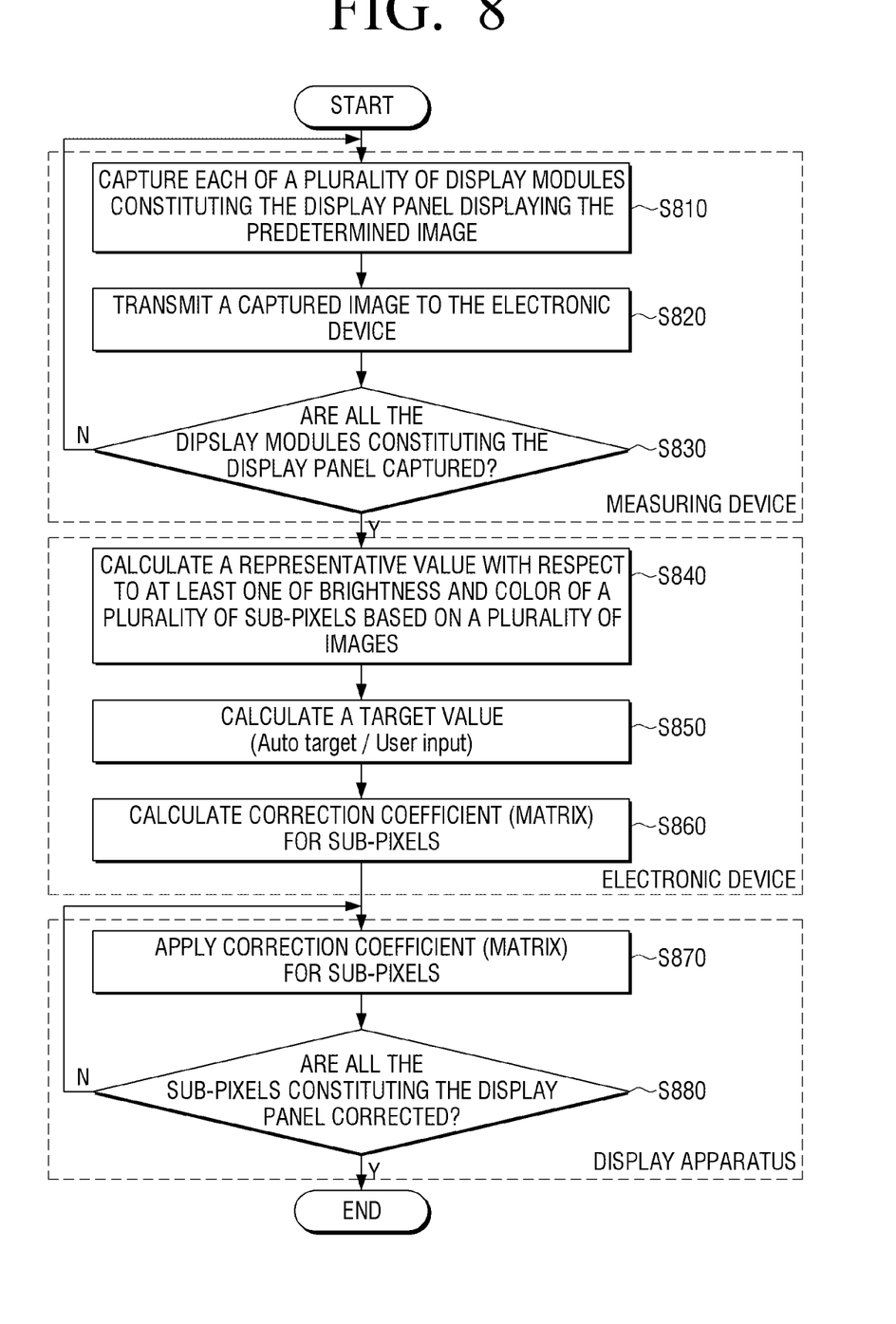
FIG. 8 is a flowchart to describe a method for calculating a correction coefficient of an electronic device according to an embodiment of the disclosure.

FIG. 8 is a flowchart to describe a method for calculating a correction coefficient of an electronic device according to an embodiment of the disclosure.

Referring to FIG. 8, the measuring device according to an embodiment of the disclosure may capture each of a plurality of display modules constituting the display panel for displaying a predetermined image in operation S810.

The measuring device may transmit the captured image to the electronic device in operation S820.

Subsequently, when the measuring device captures all the display modules constituting the display panel in operation S830-Y, the electronic device may calculate the target value based on at least one of the brightness and color of each of the plurality of sub-pixels based on the plurality of images in operation S840.

The electronic device may calculate the representative value based on at least one of the predetermined condition and the user input, and calculate the target value based on the calculated representative value in operation S850.

The electronic device may then calculate a correction coefficient by sub-pixels to correct at least one of the brightness and color of the plurality of sub-pixels to the target value in operation S860.

The display apparatus may then receive correction coefficients from the electronic device and apply the received correction coefficients to the corresponding sub-pixels in operation S870.

The display apparatus may repeatedly perform the correction until all the sub-pixels constituting the display panel are corrected in operation S880.

Figure 9:
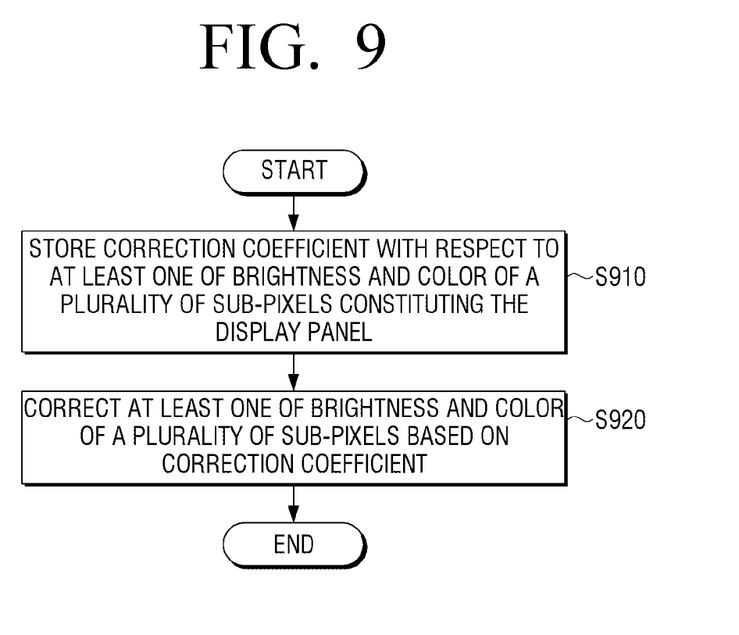
FIG. 9 is a flowchart to describe a control method for a display apparatus according to an embodiment of the disclosure.

FIG. 9 is a flowchart to describe a control method for a display apparatus according to an embodiment of the disclosure.

Referring to FIG. 9, the display apparatus including the display panel including a plurality of display modules according to an embodiment of the disclosure may store correction coefficient of at least one of the brightness and color of a plurality of sub-pixels constituting the display panel in operation S910.

The display apparatus may correct at least one of the brightness and the color of the plurality of sub-pixels based on the correction coefficient in operation S920. Here, the correction coefficient may be a value for correcting at least one of the brightness and color of a plurality of sub-pixels to the target value calculated based on a plurality of images of each of the plurality of the display modules constituting the display panel.

In operation S910, the correction coefficient may be received from the external electronic device and stored. Here, the external electronic device may calculate the target value based on at least one of the brightness and color of each of the plurality of sub-pixels constituting the display panel based on the plurality of images, calculate the correction coefficient to correct at least one of the brightness and color of the plurality of sub-pixels to the target value, and transmit the correction coefficient to the display apparatus.

The methods according to various embodiments of the disclosure described above can be implemented with only software upgrades for existing electronic devices.

Also, a non-transitory computer readable medium may be provided in which a program for sequentially executing the control method according to embodiment of the disclosure.

For example, a non-transitory computer readable medium storing a program which executes the operations of obtaining a plurality of images of each of a plurality of display modules constituting a display panel displaying a predetermined image; calculating a target value based on at least one of brightness and color of a plurality of sub-pixels, and calculating a correction coefficient for correcting at least one of brightness and color of the plurality of sub-pixels to a target value and transmitting the correction coefficient to the display panel may be provided.

The non-transitory computer readable medium refers to a medium that stores data semi-permanently, and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, the ROM or etc., and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a communication unit;
 a storage; and
 a processor configured to:
  store a plurality of images obtained by dividing a display panel of a display apparatus into a plurality of display modules and sequentially capturing the plurality of display modules disposed in the display panel which displays a predetermined image to the storage, each of the plurality of display modules comprising a plurality of sub-pixels,
  identify an image from among the plurality of images based on a predetermined condition, the image corresponding to a display module from among the plurality of display modules,
  obtain a target value based on at least one of brightness and color of all sub-pixels constituting the display module,
  obtain a correction coefficient for correcting at least one from among the brightness and color of each of the plurality of sub-pixels corresponding to the plurality of display modules to the target value, wherein all of the plurality of sub-pixels constituting the display panel are corrected by the correction coefficient, obtain information corresponding to a binning group of sub-pixels from among the plurality of sub-pixels, wherein characteristics of the binning group of sub-pixels correspond to a maximum value associated with the plurality of sub-pixels, and control the communication unit to transmit the calculated correction coefficient to the display apparatus based on the information corresponding to the binning group of sub-pixels.

2. The electronic device of claim 1, wherein the processor is further configured to calculate a representative value with respect to at least one from among the brightness and color of each of the plurality of sub-pixels, and calculate the target value based on the calculated representative value.

3. The electronic device of claim 2, further comprising:
an inputter configured to receive a user command,
wherein the processor is further configured to set the target value based on a value inputted through the inputter and the representative value.

4. The electronic device of claim 1, wherein the image is an image which captures at least one from among the brightness and color of a plurality of sub-pixels constituting the display panel through a colorimeter.

5. The electronic device of claim 1, wherein the display module is implemented as a light emitting diode (LED) module including at least one LED element or an LED cabinet connected with a plurality of LED modules.

6. The method of claim 1, wherein the correction coefficient unifies the brightness and color among each of the display modules, for uniformity of the brightness and the color among the plurality of display modules.

7. A display apparatus comprising:
a display panel including a plurality of display modules each of which is composed of a plurality of sub-pixels;
a storage configured to:
store a correction coefficient with respect to at least one from among the brightness and color of a plurality of sub-pixels constituting the display panel, and
store information corresponding to a binning group of sub-pixels from among the plurality of sub-pixels, wherein characteristics of the binning group of sub-pixels correspond to a maximum value associated with the plurality of sub-pixels; and
a processor configured to correct at least one from among the brightness and color of the plurality of the sub-pixels based on the information corresponding to the binning group of sub-pixels, wherein all of the plurality of sub-pixels constituting the display panel are corrected by the correction coefficient,
wherein the correction coefficient is a target value calculated based on an image from among a plurality of images obtained by sequentially capturing each of the plurality of display modules, the image corresponding to a display module from among the plurality of display modules, and
wherein the target value is a value for correcting at least one from among the brightness and color of the plurality of sub-pixels and corresponds to at least one of brightness and color of all sub-pixels constituting the display panel based on the plurality of images.

8. The display apparatus of claim 7, further comprising: a communication unit,
wherein the processor is further configured to:

store the correction coefficient received from an external electronic device through the communication unit in the storage, and wherein the external electronic device is further configured to:
obtain the target value based on at least one of the brightness and color of the all sub-pixels constituting a display module from among the plurality of display modules based on the plurality of images,
obtain a correction coefficient to correct at least one from among the brightness and color of each of the plurality of sub-pixels to the target value, and
transmit the correction coefficient corresponding to the plurality of display modules to the display apparatus.

9. The display apparatus of claim 7, wherein the correction coefficient unifies the brightness and color among each of the display modules, for uniformity of the brightness and the color among the plurality of display modules.

10. A control method for an electronic device for correcting at least one from among the brightness and color of a plurality of sub-pixels constituting a display panel, the control method comprising:
obtaining a plurality of images by dividing a display panel of a display apparatus into a plurality of display modules and sequentially capturing the plurality of display modules constituting the display panel which displays a predetermined image, each of the plurality of display modules comprising a plurality of sub-pixels;
identifying an image from among the plurality of images based on a predetermined condition, the image corresponding to a display module from among the plurality of display modules;
obtaining a target value based on at least one of the brightness and color of all sub-pixels constituting the display module from among the plurality of display modules based on the plurality of images;
obtaining a correction coefficient for correcting at least one from among the brightness and color of each of the plurality of sub-pixels to the target value, wherein all of the plurality of sub-pixels constituting the display panel are corrected by the correction coefficient,
obtaining information corresponding to a binning group of sub-pixels from among the plurality of sub-pixels, wherein characteristics of the binning group of sub-pixels correspond to a maximum value associated with the plurality of sub-pixels and
transmitting the calculated correction coefficient corresponding to the plurality of display modules to the display apparatus based on the information corresponding to the binning group of sub-pixels.

11. The control method of claim 10, wherein the calculating the target value comprises calculating a representative value with respect to at least one from among the brightness and color of each of the plurality of sub-pixels and calculating the target value based on the calculated representative value.

12. The control method of claim 11, further comprising:
receiving a user command,
wherein the calculating the target value comprises calculating the target value based on a value inputted according to the user command and the representative value.

13. The control method of claim 10, wherein the plurality of images are images which capture at least one from among the brightness and color of a plurality of sub-pixels constituting the display panel through a colorimeter.

14. The control method of claim 10, wherein the display module is implemented as an LED module including at least one LED element or an LED cabinet connected with a plurality of LED modules.

15. The control method of claim 10, wherein the correction coefficient unifies the brightness and color among each of the display modules, for uniformity of the brightness and the color among the plurality of display modules.

\* \* \* \* \*